Patented Aug. 21, 1945

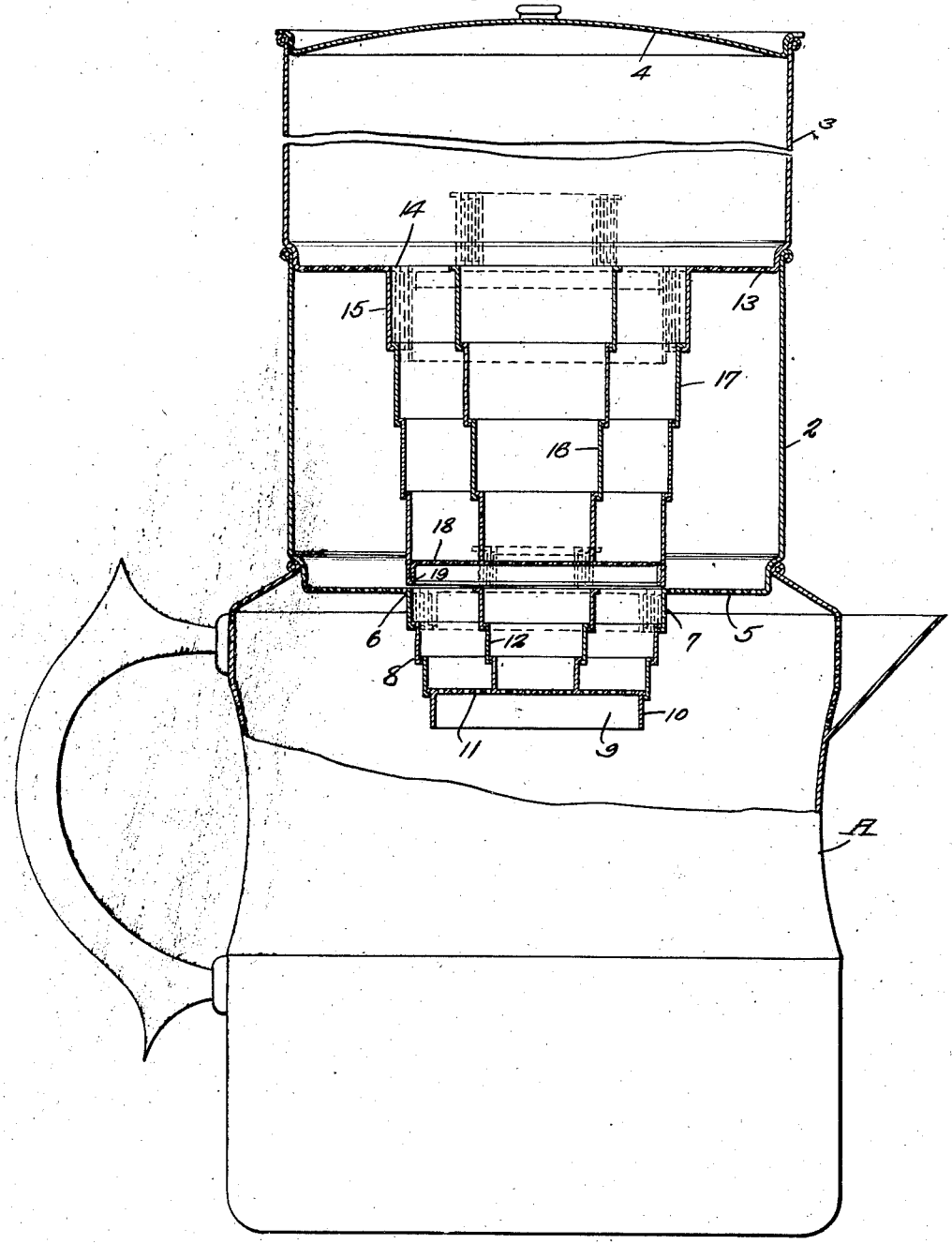

2,383,144

UNITED STATES PATENT OFFICE 2,383,144

COFFEE MAKER

Ralph H. Moore, Pasadena, Calif.

Application September 24, 1943, Serial No. 503,702

3 Claims. (Cl. 99—285)

This invention relates to coffee makers, one of the objects being to provide a device of this character having a receptacle for coffee grounds and a receptacle for hot water, both of the receptacles being adjustable so that, when filled, they will hold a predetermined amount of coffee and of water.

A further object is to provide a coffee maker which obviates the necessity of utilizing a measuring spoon inasmuch as the respective compartments constitute the measures both for the coffee and for the hot water.

A still further object is to provide a coffee maker the water-measuring portion of which can collapse, when not in use, so as to occupy minimum space, the coffee-measuring portion being similarly collapsible.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing, which is a view partly in section and partly in elevation of a coffee maker constructed in accordance with the present invention, the preferred form of the invention has been shown.

In said drawing, A designates a coffee pot of any suitable construction from which coffee can be poured after it has been prepared. This coffee pot is open at the top so as to support the coffee container 2 which, in turn, is adapted to support a water container 3. This latter container has the usual closure 4.

The bottom of the coffee container 2 is perforated as indicated at 5 and has a central opening 6 from the wall of which depends a circular sleeve 7. This sleeve constitutes the upper member of a telescopic cup 8 the members of which are adapted to collapse upwardly. The bottom section 9 of this cup has a depending flange 10 while its top 11 is perforated. Thus when the cup is collapsed upwardly the perforated portion 11 will be brought into position substantially flush with the perforated portion 5.

Mounted on the perforated bottom 11 of the section 9 is a collapsible cup 12. This cup is adapted to collapse downwardly onto the bottom 11. The capacities of the cups 8 and 12 can vary. For example, cup 12, when extended can hold enough coffee to make one cupful of coffee while cup 8, when extended, can hold enough to make three cups of coffee. When the two cups are collapsed and the bottom 11 is brought into position flush with bottom 5, the container 2 can be used for holding larger amounts of coffee such as required when making, for example, four to eight cups of coffee.

The water container 3 has a perforated bottom 13 provided with a central opening 14 from the wall of which depends a sleeve 15. This sleeve constitutes the upper end of a collapsible cup 17 the bottom 18 of which is perforated and carried by a flanged lower section 19. Mounted on the bottom 18 is the lower section of an inner collapsible cup 16 the diameter of which is less than that of the cup 17. Obviously the outer cup 17 can be collapsed upwardly so as to bring the perforated bottom 18 into position flush with the perforated bottom 13 and at the same time the cup 16 can be collapsed downwardly. Thus the parts can be brought substantially to the positions indicated by broken lines in the drawing.

By extending the cups downwardly, the inner cup 16 can be used for holding enough water to make one cup of coffee and the perforated bottom of this inner cup will be located over the inner cup 12 so that water draining from the inner cup will flow downwardly into the cup 12 and the contents thereof.

The inner cup 16 can be collapsed and the outer cup used for holding enough water to make the amount of coffee provided for by the contents of the extended cup 8 and the contents of this outer cup 17 will strip downwardly into the cup 8 and the contents thereof. By collapsing the two cups 15 and 17 so that the bottom 18 will be flush with the bottom 13, the placement of a large amount of coffee in the container 2 will not be interfered with and the container 3 can be supplied with sufficient water to make a large quantity of the beverage. When the cups 17 and 18 are collapsed, it is designed to also collapse the cups 8 and 12. These cups are to be extended only when small portions of coffee are to be prepared.

Importance is attached to the fact that both the collapsible water container and the collapsible coffee container constitute measuring devices, and when the two parts are properly adjusted relative to each other, one for holding the proper amount of coffee and the other for holding the proper amount of water, the resultant beverage will be of the proper strength. This is due to the fact that where a small amount of coffee is used, it is not spread over a large area as would be the case should the small amount of coffee be prepared in a large container such as one designed for making six or eight cups of coffee. Instead the correct amount of coffee for making one cup, for example, can be held within a restricted area and the proper amount of water to be delivered thereto can be similarly located so that it will drip only in that portion of the coffee maker in which the coffee is located.

What is claimed is:

1. In a coffee maker the combination with a coffee-pot and a coffee container thereon having a perforated bottom, of a coffee-measuring device carried by said bottom and including telescopically connected coffee-measuring sections, one of said sections having a perforated bottom movable into and out of position flush with the perforated bottom of the container, and means for directing water onto the contents of the coffee-measuring sections.

2. In a coffee maker the combination with a coffee pot, of a coffee measuring and holding container, constituting a closure for the coffee pot, said container having a perforated bottom surrounding an aperture, a telescopic coffee measure secured to said bottom and constituting a downwardly expansible closure for the opening in said bottom, the bottom of said coffee measure being perforated and the walls thereof being imperforate, the sections of said telescopic measure being in frictional contact one with the other whereby said measure will support a filling of coffee when adjusted to any length, and a water container constituting a closure for the coffee container, said water container having a perforated bottom and a central opening, and a telescopic water measure extending downwardly from the perforated bottom of the water container and constituting a closure for the opening in said bottom, said telescopic closure of the water container being provided with imperforate walls and a perforated bottom, the sections of the telescopic closure being in frictional engagement one with the other thereby to hold the container at any predetermined length while filled with water and said telescopic closure of the water container being adjustable toward and from the telescopic closure of the bottom of the coffee container.

3. In a coffee maker the combination with a coffee pot, of a coffee measuring and holding container, constituting a closure for the coffee pot, said container having a perforated bottom surrounding an aperture, a telescopic coffee measure secured to said bottom and constituting a downwardly expansible closure for the opening in said bottom, the bottom of said coffee measure being perforated and the walls thereof being imperforate, the sections of said telescopic measure being in frictional contact one with the other whereby said measure will support a filling of coffee when adjusted to any length, and a water container constituting a closure for the coffee container, said water container having a perforated bottom and a central opening, and a telescopic water measure extending downwardly from the perforated bottom of the water container and constituting a closure for the opening in the bottom, said telescopic closure of the water container being provided with imperforate walls and a perforated bottom, the sections of the telescopic closure being in frictional engagement one with the other thereby to hold the container at any predetermined length while filled with water and said telescopic closure of the water container being adjustable toward and from the telescopic closure of the bottom of the coffee container, and upwardly extending telescopic containers upon the bottoms of the respective telescopic closures.

RALPH H. MOORE.